US012689543B2

(12) United States Patent
Horiba et al.

(10) Patent No.: US 12,689,543 B2
(45) Date of Patent: Jul. 21, 2026

(54) INFORMATION PROCESSING DEVICE, INFORMATION PROCESSING METHOD AND PROGRAM

(71) Applicant: SOFTBANK CORP., Tokyo (JP)

(72) Inventors: Katsuhiro Horiba, Tokyo (JP); Keiichi Shima, Tokyo (JP); Hiroki Watanabe, Tokyo (JP); Tomoya Hasegawa, Tokyo (JP); Tatsuro Murata, Tokyo (JP); Tomoaki Kanaya, Tokyo (JP); Hirotaka Nishino, Tokyo (JP); Ryoji Hirai, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 0 days.

(21) Appl. No.: 19/110,692

(22) PCT Filed: Jul. 3, 2023

(86) PCT No.: PCT/JP2023/024580
§ 371 (c)(1),
(2) Date: Mar. 11, 2025

(87) PCT Pub. No.: WO2024/089942
PCT Pub. Date: May 2, 2024

(65) Prior Publication Data
US 2025/0260598 A1 Aug. 14, 2025

(30) Foreign Application Priority Data
Oct. 28, 2022 (JP) ................................ 2022-173804

(51) Int. Cl.
*H04L 12/66* (2006.01)
*H04L 69/18* (2022.01)
(52) U.S. Cl.
CPC .............. *H04L 12/66* (2013.01); *H04L 69/18* (2013.01)

(58) Field of Classification Search
CPC ................................ H04L 12/66; H04L 69/18
See application file for complete search history.

(56) References Cited

U.S. PATENT DOCUMENTS

2016/0262038 A1* 9/2016 Dunn .................. H04L 41/0886
2016/0262063 A1* 9/2016 Chen ..................... H04W 4/025
(Continued)

FOREIGN PATENT DOCUMENTS

CN 101686232 A * 3/2010
CN 101808397 A * 8/2010
(Continued)

OTHER PUBLICATIONS

"5G; 5G System; Technical Realization of Service Based Architecture; Stage 3 (3GPP TS 29.500 version 16.12.0 Release 16)", ETSI Technical Specification European Telecommunications Standards Institute (ETSI), 650, Route Des Lucioles; F-06921 Sophia-Antipolis; France, No. V16.12.0, Oct. 6, 2022 (Oct. 6, 2022), pp. 1-100, XP014444839, [retrieved on Oct. 6, 2022].

*Primary Examiner* — Shean Tokuta
(74) *Attorney, Agent, or Firm* — Casimir Jones, S.C.; Robert A. Goetz

(57) ABSTRACT

This invention enables flexible connection with a wide variety of core networks even without changing, for example, equipment and/or operating systems related to existing base stations. This invention serves as at least one of (i) an interface via which a base station and a first core network are connected with each other and (ii) an interface via which a terminal device connected with the first core network via the base station and the first core network are connected with each other, and includes: a first stateful communication section (51) carrying out communication with the base station according to a stateful protocol; and a stateless communication section (52) carrying out commu-
(Continued)

nication with the first core network according to a stateless protocol.

10 Claims, 8 Drawing Sheets

(56)                    References Cited

U.S. PATENT DOCUMENTS

| | | | |
|---|---|---|---|
| 2016/0262069 A1* | 9/2016 | Parsay | H04W 28/00 |
| 2016/0269954 A1* | 9/2016 | Purohit | H04L 41/082 |
| 2017/0251357 A1* | 8/2017 | Iwai | H04W 92/14 |
| 2019/0306762 A1* | 10/2019 | Chen | H04W 88/12 |
| 2023/0389091 A1* | 11/2023 | He | H04L 67/133 |

FOREIGN PATENT DOCUMENTS

| | | | | | |
|---|---|---|---|---|---|
| CN | 101815256 | A | * | 8/2010 | |
| CN | 101932121 | A | * | 12/2010 | H04W 76/12 |
| CN | 101938736 | A | * | 1/2011 | H04L 69/161 |
| CN | 102065565 | A | * | 5/2011 | H04W 92/045 |
| CN | 104244308 | A | * | 12/2014 | |
| CN | 113347738 | A | * | 9/2021 | H04L 61/4511 |
| CN | 115883047 | A | * | 3/2023 | H04L 5/00 |
| CN | 115883047 | B | * | 4/2024 | H04L 5/00 |
| JP | 2022-090476 | | | 6/2022 | |
| JP | 2022090476 | A | * | 6/2022 | H04W 36/12 |
| JP | 7374285 | B1 | * | 11/2023 | H04L 69/18 |
| JP | 7402292 | B1 | * | 12/2023 | H04W 76/15 |
| WO | WO-2016035230 | A1 | * | 3/2016 | H04W 92/14 |
| WO | WO-2017118199 | A1 | * | 7/2017 | H04W 72/51 |

* cited by examiner

INFORMATION PROCESSING DEVICE, INFORMATION PROCESSING METHOD AND PROGRAM

TECHNICAL FIELD

The present invention relates to an information processing device, an information processing method, and a program, specifically, to an information processing device, an information processing method, and a program each enabling flexible connection with a wide variety of core networks even without changing, for example, equipment and/or operating systems related to existing base stations.

BACKGROUND ART

The Third Generation Partnership Project (3GPP) has established, in Release15, the technical specifications for network slicing in mobile communication networks. This makes it possible to construct a large number of core networks according to various purposes, for example.

In recent years, against this background, many business operators are trying to construct new networks. However, it is not practical for a business operator newly entering the field of mobile communication networks to set its own base station. Thus, there are many discussions about a use mode, such as base station sharing, in which a single base station is connected with a plurality of core networks.

In such a use mode, the base station needs to be capable of flexibly carrying out communication with a large number of core networks. Furthermore, it is necessary to identify a core network which is a destination of a signal received from a terminal and to transmit the signal to the identified core network.

Patent Literature 1 discloses switching the destination core network from one to another on the basis of an identifier included in the signal received from the terminal device.

CITATION LIST

Patent Literature

[Patent Literature 1]
Japanese Patent Application Publication, Tokukai, No. 2022-090476

SUMMARY of INVENTION

Technical Problem

However, the existing base stations are designed without assuming existence of a large number of core networks. Thus, the number of Access and Mobility Management Functions (AMFs) which are connectable is limited.

Further, as the idea of Virtual Mobile Network Operator (VMNO) is being practically realized in the future, it is assumed that the communication modes for the core networks will change. However, changing functions and/or the like of the existing base stations according to the specifications of the core networks is a large burden on communication business operators. Thus, it has been expected to realize a technique that enables flexible connection with a wide variety of core networks even without changing, for example, equipment and/or operating systems related to the existing base stations.

An aspect of the present invention has an object to realize a technique that enables flexible connection with a wide variety of core networks even without changing, for example, equipment and/or operating systems related to the existing base stations.

Solution to Problem

An information processing device in accordance with an aspect of the present invention is an information processing device which is connected with a base station and which serves as at least one of (i) an interface via which the base station and a first core network are connected with each other and (ii) an interface via which a terminal device connected with the first core network via the base station and the first core network are connected with each other, the information processing device including: a first stateful communication section configured to carry out communication with the base station according to a stateful protocol; and a stateless communication section configured to carry out communication with the first core network according to a stateless protocol.

An information processing method in accordance with an aspect of the present invention is an information processing method for an information processing device which is connected with a base station and which serves as at least one of (i) an interface via which the base station and a first core network are connected with each other and (ii) an interface via which a terminal device connected with the first core network via the base station and the first core network are connected with each other, the information processing method including: a first stateful communication step of carrying out communication with the base station according to a stateful protocol; and a stateless communication step of carrying out communication with the first core network according to a stateless protocol.

The aspects of the present invention may be realized by a computer. In this case, the present invention also includes: a program causing the computer to execute the steps of the above-described method; and a computer-readable storage medium in which the program is stored.

Advantageous Effects of Invention

According to an aspect of the present invention, it is possible to realize a technique that enables flexible connection with a wide variety of core networks even without changing, for example, equipment and/or operating systems related to the existing base stations.

BRIEF DESCRIPTION OF DRAWINGS

FIG. 7 is a view illustrating an example of selecting a core network in response to requests from a plurality of different pieces of UE connected via different base stations.

FIG. 8 is a view illustrating an example of a configuration of a computer which executes an instruction of a program that is software realizing each function.

DESCRIPTION OF EMBODIMENTS

The following description will discuss embodiments of the present invention with reference to the drawings. First, a problem of conventional techniques will be described.

The 3GPP has established, in Release15, the technical specifications for network slicing in mobile communication networks. The network slicing allows construction of multiple core networks operated by 5G VMNO without being tied to a physical interface, for example. This makes it possible to construct a large number of core networks according to various purposes.

In recent years, against this background, many business operators are trying to construct new networks. However, it is not practical for a business operator newly entering the field of mobile communication networks to set its own base station. Thus, there are many discussions about a use mode, such as base station sharing, in which a single base station is connected with a plurality of core networks.

Figure 1:
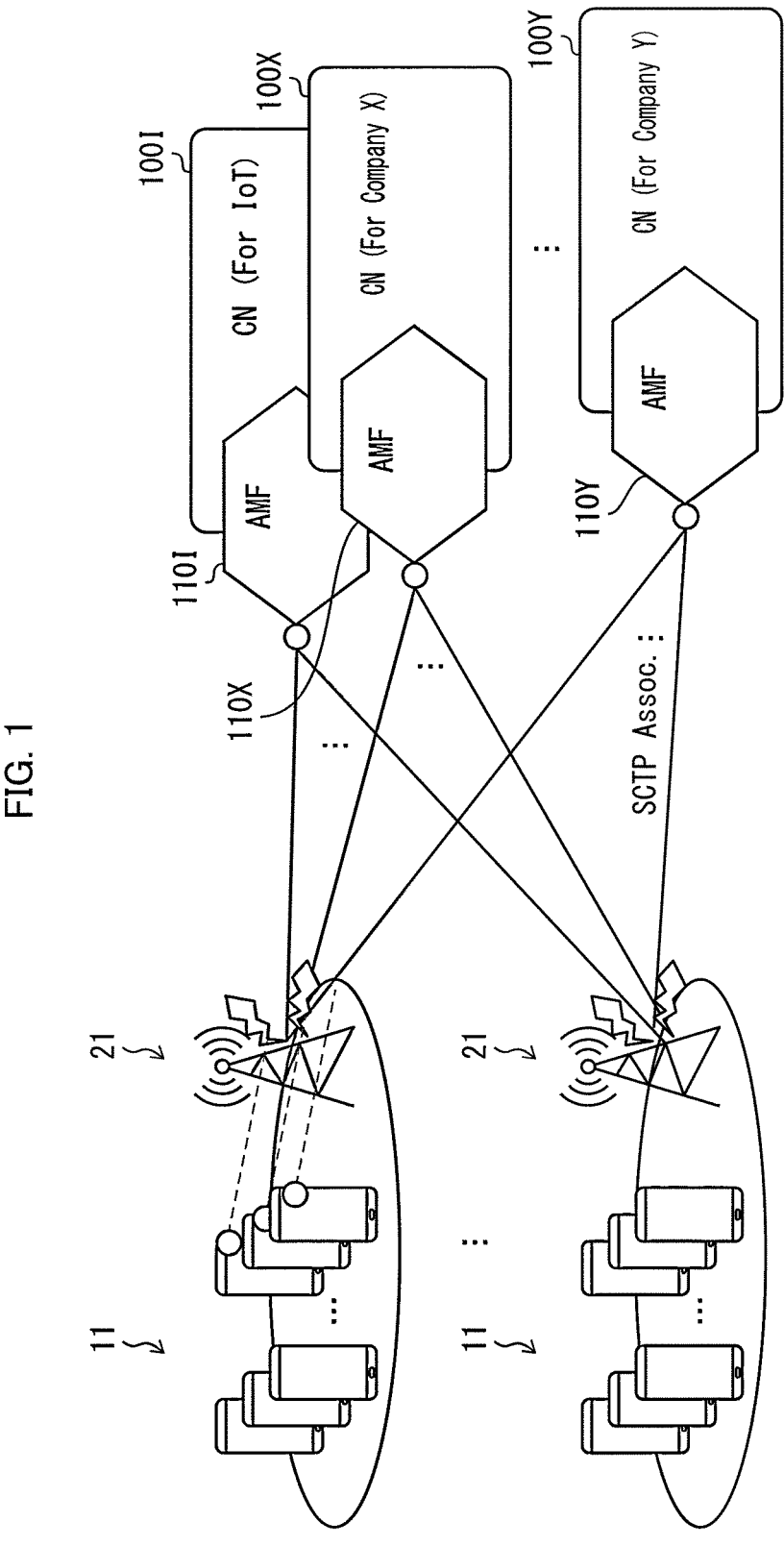
FIG. 1 is a view illustrating a configuration of a 5G communication network in which base stations are provided by a large number of core networks.

FIG. 1 is a view illustrating a configuration of a 5G communication network in which base stations are provided by a large number of core networks.

In the example shown in FIG. 1, a core network 100I, a core network 100X, . . . , and a core network 100Y, which constitute the 5G communication network, are illustrated. The core network 100I is a core network which is assumed to be used in relation to IoT, and is not used for, e.g., calling between terminals.

The core network 100X is, for example, a core network operated by company X, which is a business operator. The core network 100X serves as a core network in a general 5G communication network.

The core network 100Y is, for example, a core network operated by company Y, which is a business operator. The core network 100Y serves as a core network in a general 5G communication network.

In the example shown in FIG. 1, a plurality of base stations 21, which constitute the 5G communication network, are illustrated. Actually, there exist tens of thousands of base stations 21. Each of the base stations 21 carries out communication with pieces of User Equipment (UE) 11, which are a plurality of terminals located within a cell that is indicated by an ellipse shown in FIG. 1 and that is a given radio communication area. For example, a single base station 21 simultaneously carries out communication with several hundred pieces of UE 11.

The base station 21 is connected with a core network such that the base station 21 is connected with an AMF, which is one of Network Functions (NFs) in the core network. For example, the core network 100I is provided with an AMF 110I, the core network 100A is provided with an AMF 110X, . . . and the core network 100Y is provided with an AMF 110Y.

As shown in FIG. 1, the plurality of base stations 21 are connected with the AMF 110I, the AMF 110X, . . . , and the AMF 110Y. Each of the base stations 21 is connected with the AMFs via an N2 interface defined by TS.23.501, which is one of the 3GPP standards. Each of the pieces of UE 11 is connected with a corresponding one of the AMFs via an N1 interface. With the N2 interface, a Stream Control Transmission Protocol (SCTP) association is established between the base station 21 and the AMF.

However, the existing base stations 21 are designed without assuming existence of a large number of core networks. Thus, the number of AMFs which are connectable is limited. For example, for each of the existing base stations 21, the number of SCTP associations which can be held is 32 or 64. Thus, in order to allow each of the base stations 21 to be connected with a large number of core networks, reinforcing the equipment of the base station 21 is considered. However, taking a measure of, e.g., reinforcing the equipment with respect to all of the tens of thousands of base stations 21 provided in a large area will take too much cost.

A SCTP specified in the N2 interface is a stateful protocol, and therefore session management needs to be carried out. For example, a process related to a given system procedure and/or the like needs to be completed within a predetermined period. In a case where the session management such as the above-described one is carried out, congestion is likely to occur, e.g., due to concentration of access to a single AMF which may occur when a natural disaster or the like occurs. Thus, development of a technique has been expected that enables more scalable communication between the base station and the core network.

As discussed above, as the idea of VMNO is being realized, it is assumed that the communication modes for the core networks will change. In such a situation, it has been expected to realize a technique that enables the existing base stations to be connected with a wide variety of core networks.

First Embodiment

Configuration of Network

Figure 2:
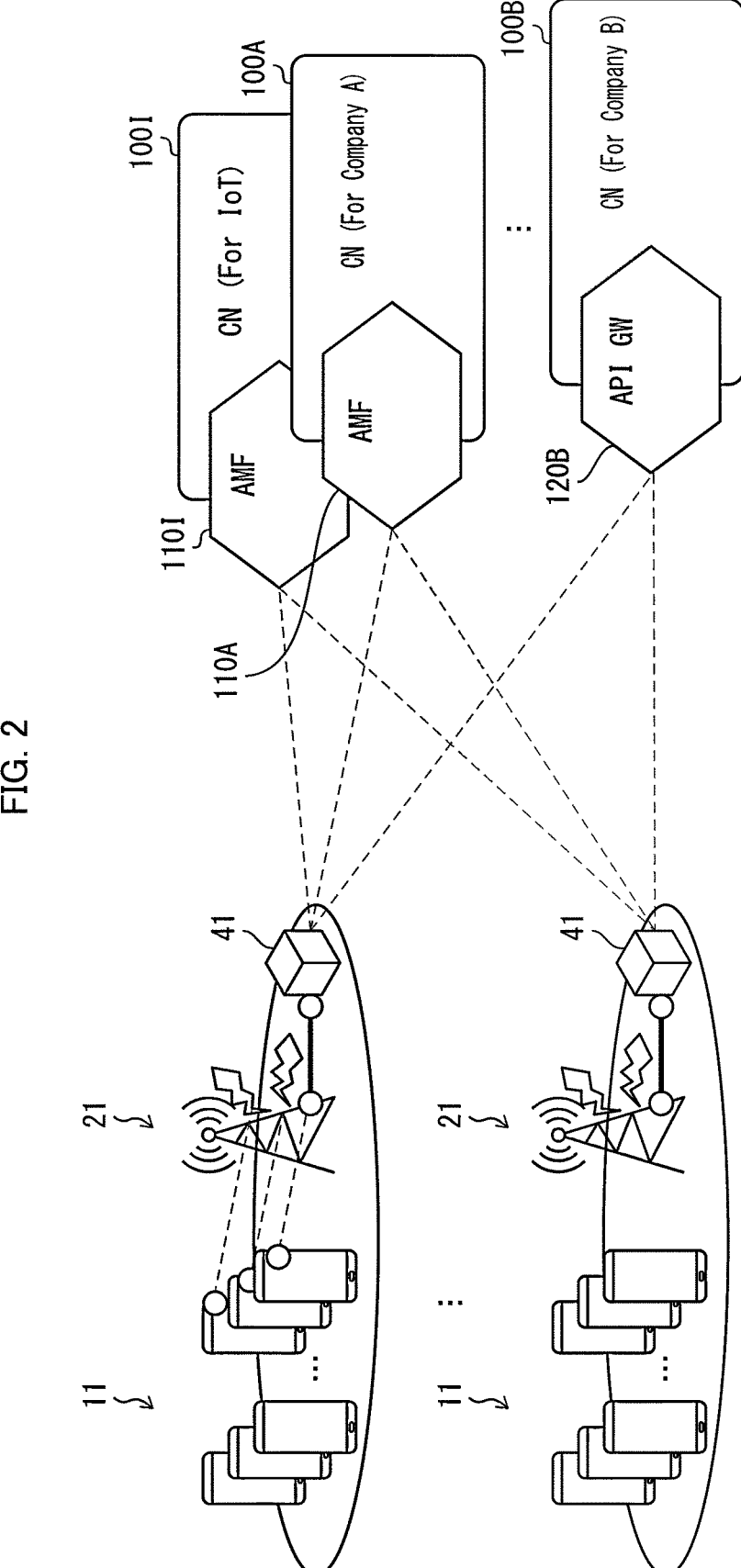
FIG. 2 is a view illustrating a configuration of a 5G communication system in accordance with the present embodiment.

FIG. 2 is a view illustrating a configuration of a 5G communication system in accordance with the present embodiment. In the example shown in FIG. 2, a core network 100I, a core network 100A, . . . , and a core network 100B, which constitute a 5G communication network, are illustrated.

As described with reference to FIG. 1, the core network 100I is a core network which is assumed to be used in relation to IoT, and is not used for, e.g., calling between terminals. The core network 100I is provided with an AMF 110I.

As described with reference to FIG. 1, the core network 100A is, for example, a core network operated by company A, which is a business operator. The core network 100A serves as a core network in a general 5G communication network. The core network 100A is provided with an AMF 110A.

The core network 100B is, for example, a core network operated by company B, which is a business operator. The core network 100B serves as, for example, a core network which is available at a quite low communication charge. In order to reduce the operation cost, the core network 100B partially employs, for example, a unique communication mode which is different from the mode specified in the 3GPP standards. In one example, in the core network 100B, a NF specified by TS.23.501 is not provided and processes related to respective system procedures specified by TS.23.502 are executed according to the unique mode.

Further, in one example, the core network 100B employs a stateless protocol instead of the SCTP specified in the N2 interface. Thus, the core network 100B is provided with an Application Programming Interface (API) gateway 120B instead of the AMF. In one example, the API gateway 120B is constituted by software using an API which is created by company B; and the API gateway 120B starts processes related to respective system procedures specified by TS.23.502 in response to a request, without establishing a SCTP association. It is assumed here that an API created by company B is available in public.

In the example shown in FIG. 2, only the core network 100B is illustrated as a core network having an API gateway. Not only this, other core network(s) having API gateway may exist. For example, a core network 100J having an API gateway 120J constituted by software using an API created by company J, a core network 100K having an API gateway 120K constituted by software using an API created by company K, and/or the like may exist.

Note that, in a case where the core network 100I, the core network 100A, the core network 100B, . . . , and the like do not need to be distinguished from each other, these core networks will collectively be referred to as "core networks 100" as appropriate. Similarly, the AMFs will collectively be referred to as "AMFs 110" as appropriate. Also, the API gateways will collectively be referred to as "API gateways 120" as appropriate.

Similarly to FIG. 1, FIG. 2 illustrates a plurality of base stations 21, which constitute the 5G communication network. Actually, there exist tens of thousands of base stations 21. The base stations 21 carry out communication with pieces of UE 11, which are a plurality of terminals located within a cell that is indicated by an ellipse shown in FIG. 2 and that is a given radio communication area. For example, a single base station 21 simultaneously carries out communication with several hundred pieces of UE 11.

Unlike in the case of FIG. 1, the base stations 21 are connected with the core networks via N1N2 gateways 41 in the example shown in FIG. 2. Each of the N1N2 gateways 41 is a device which relays communication carried out via the N1 interface and the N2 interface. That is, the pieces of UE 11 are connected with the core networks 100 via the base stations 21, and the base stations 21 are connected with the core networks via the N1N2 gateways 41.

As compared with the base station 21, the N1N2 gateway 41 can hold a far more number of SCTP associations. The N1N2 gateway 41 is configured to be capable of holding several hundreds of SCTP associations, for example.

Unlike in the case shown in FIG. 1, each of the N1N2 gateways 41 provided for the plurality of base stations 21 is connected with the AMF 110I, the AMF 110A, . . . , and the API gateway 120B, in the case shown in FIG. 2. Each of the base stations 21 is connected with the N1N2 gateways 41 via the N2 interface specified by TS.23.501, which is one of the 3GPP standards. Each of the pieces of UE 11 is connected with a corresponding one of the AMFs or the API gateway via the N1 interface.

In the example illustrated in FIG. 2, a single N1N2 gateway 41 is provided for a single base station 21. Alternatively, provided that a given condition is satisfied, a single N1N2 gateway 41 may be provided for a plurality of base stations 21.

Configuration of N1N2 Gateway

Figure 3:
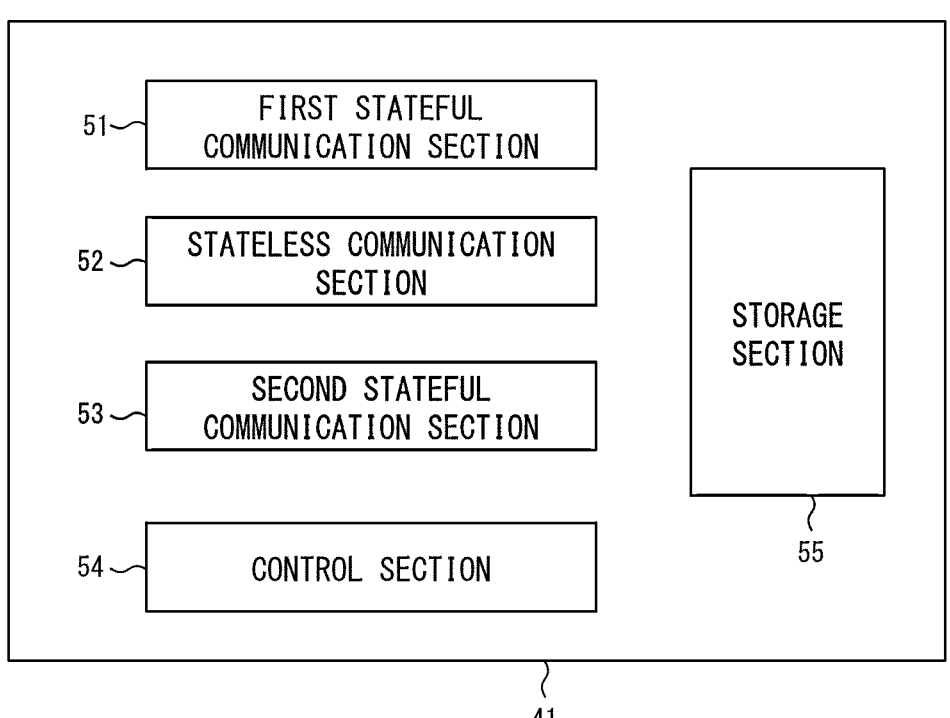
FIG. 3 is a view showing an example of a configuration of an N1N2 gateway 41.

FIG. 3 is a view showing an example of a configuration of the N1N2 gateway 41. As shown in FIG. 3, the N1N2 gateway 41 includes a first stateful communication section 51, a stateless communication section 52, a second stateful communication section 53, a control section 54, and a storage section 55.

The N1N2 gateway 41 is an information processing device connected with the base station 21, serves as at least one of (i) the N2 interface via which the base station 21 and the core network 100B are connected with each other and (ii) the N1 interface via which the UE connected with the core network 100B via the base station and the core network 100B are connected with each other, and includes: the first stateful communication section 51 configured to carry out communication with the base station 21 according to the stateful protocol; and the stateless communication section 52 configured to carry out communication with the core network 100B according to the stateless protocol.

The N1N2 gateway 41 further includes the second stateful communication section 53 configured to carry out communication with the core network 100I or the core network 100A according to the stateful protocol, and serves as at least one of (i) an interface via which the base station 21 and the core network 100I or the core network 100A are connected with each other and (ii) an interface via which the UE 11 connected with the core network 100I or the core network 100A via the base station 21 and the core network 100I or the core network 100A are connected with each other.

The stateful protocol is a SCTP, for example. The stateless protocol is a communication protocol in which every request is dealt with as a transaction isolated from a previous request so that communication is constituted by an independent set of a request and a response. That is, it is possible to employ any communication protocol in which information related to sessions is not held and state management is not carried out. To be more specific, the stateless protocol may be, for example, a Remote Procedure Call (RPC) or a Message Queue (MQ). Alternatively, the stateless protocol may be a Hypertext Transfer Protocol (HTTP).

First Stateful Communication Section

In order to carry out communication with the base station 21, the N1N2 gateway 41 uses the first stateful communication section 51 for the communication. Consequently, a SCTP association is established between the base station 21 and the AMF, and the base station 21 carry out transmission and reception of messages via the N2 interface. The pieces of UE 11 which carry out communication with the core networks via the base stations 21 carry out transmission and reception of messages via the N1 interface.

In a case where a single N1N2 gateway 41 is provided for a plurality of base stations 21, the first stateful communication section 51 carries out communication with the plurality of base stations.

Stateless Communication Section

In order to carry out communication with the core network 100B, the N1N2 gateway 41 uses the stateless communication section 52 for the communication. As described above, the core network 100B is provided with, instead of the AMF, the API gateway 120B configured to relay communication with the N1N2 gateway 41. That is, in the API gateway 120B, the stateless protocol is employed, and thus a SCTP association is not established. Therefore, the N1N2 gateway 41 converts the protocol for communication between the base station 21 and the core network 100B into the stateless protocol.

Second Stateful Communication Section

In order to carry out communication with the core network 100I or the core network 100A, the N1N2 gateway 41 uses the second stateful communication section 53 for the communication. That is, transmission and reception of messages with respect to the AMF 110I and the AMF 110A are carried out via the N2 interface. Thus, the N1N2 gateway 41 establishes a SCTP association with these AMFs.

Storage Section

The N1N2 gateway 41 identifies, on the basis of a message transmitted from the base station 21, which of the core network 100I, the core network 100A, . . . , and the core network 100B is a communication destination. In one example, the N1N2 gateway 41 identifies the communication destination on the basis of a Public Land Mobile Network (PLMN)-ID, which is a business operator identifier included in the message transmitted from the base station 21.

In the N1N2 gateway 41, information such as a table in which an address of the communication destination and a PLMN-ID are associated with each other is stored in the storage section 55 in advance. For example, information in which a PLMN-ID of company B and an address of the API gateway 120B of the core network 100B are associated with each other is stored in the storage section 55 in advance. Further, for example, information in which a PLMN-ID of company A and an address of the AMF 110A of the core network 100A are associated with each other is stored in the storage section 55 in advance.

Control Section

The control section 54 controls the above-described functional blocks so as to execute a process necessary for communication with the base station 21 or the core networks. For example, the control section 54 controls execution of a process of generating information which is to be stored in the storage section 55 and/or a process of reading out the information stored in the storage section. The control section 54 controls, e.g., execution of a process of identifying a transmission destination of information received via the first stateful communication section 51, the stateless communication section 52, or the second stateful communication section 53.

Flow of Communication Process

The following description will discuss, with reference to FIGS. 4, 5, 6, and 7, flows of various communication processes in the 5G communication system in accordance with the present embodiment which has been described with reference to FIG. 2. In the drawings, a base station is indicated as "gNB". Further, in the drawings, a "CN-1" indicates a core network, such as the core network 100I or the core network 100A, which is provided with the AMF 110 configured to carry out transmission and reception of messages via the N2 interface. In the drawings, a "CN-2" indicates a core network, such as the core network 100B, which is provided with the API gateway 120 employing the stateless protocol.

In each of FIGS. 4, 5, 6, and 7, in order that the N1N2 gateway 41 carries out communication with the base station 21, the first stateful communication section 51 is used for the communication. In order that the N1N2 gateway 41 carries out communication with the AMF 110, the second stateful communication section 53 is used for the communication. In order that the N1N2 gateway 41 carries out communication with the AMF 110, the stateless communication section 52 is used for the communication.

Establishment of NGAP Tunnel With Core Network Having AMF

Figure 4:
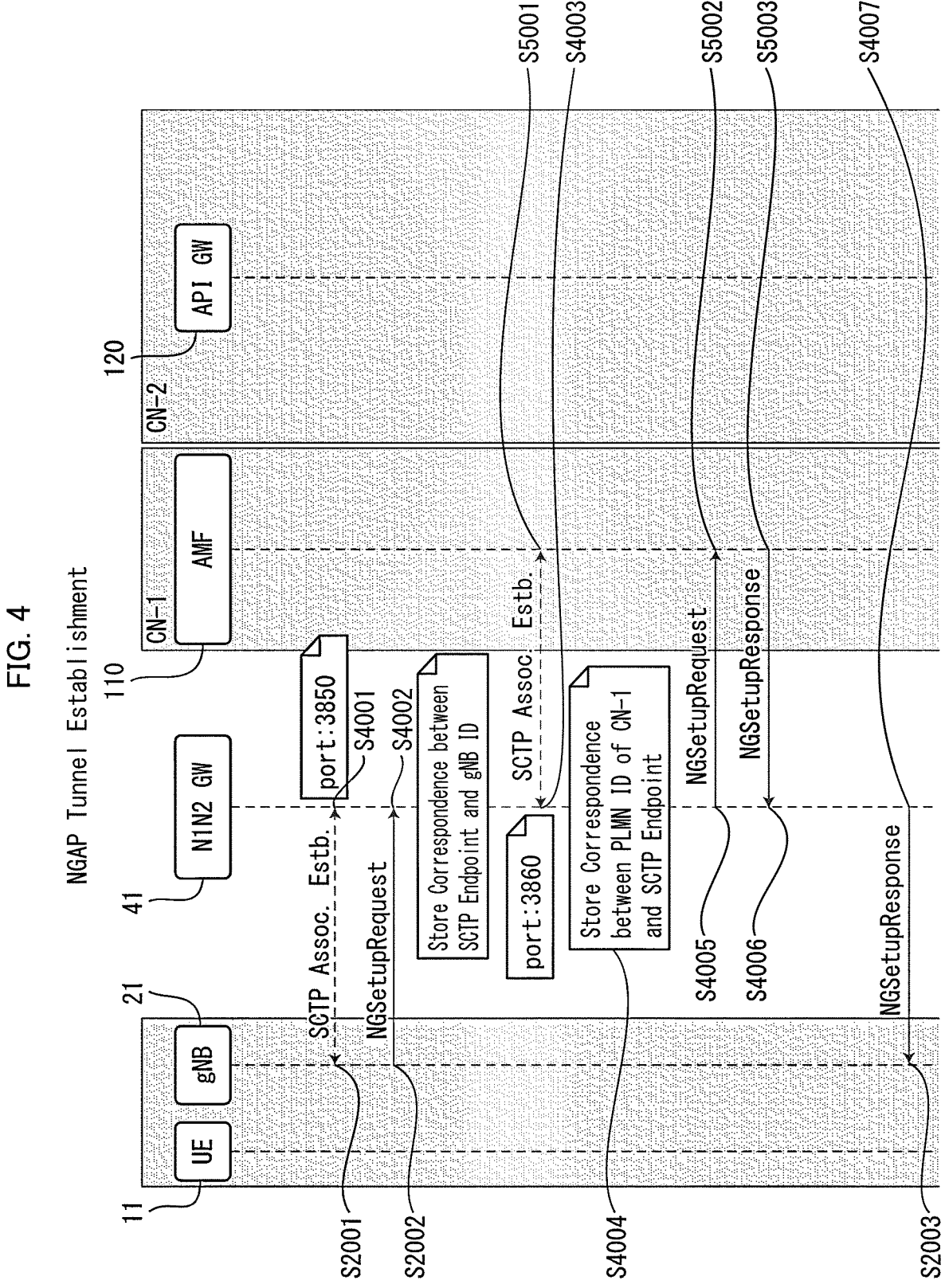
FIG. 4 is a view illustrating an example of a process related to establishment of a NGAP tunnel between a base station 21 and a CN-1.

FIG. 4 is a view illustrating an example of a process related to establishment of a Next Generation Application Protocol (NGAP) tunnel between the base station 21 and the CN-1 (for example, the core network 100I, the core network 100A).

In step S2001 and step S4001, the base station 21 and the N1N2 gateway 41 establish a SCTP association therebetween. Along with this, the N1N2 gateway 41 stores a port number "3850" of the SCTP.

In step S2002, the base station 21 transmits, to the N1N2 gateway 41, NGsetupRequest, which is a message for requesting establishment of a NGAP tunnel. In step S4002, this message is received.

In step S4003, the N1N2 gateway 41 stores a SCTP endpoint and an identifier (gNB ID) of the base station so that the SCTP endpoint and the identifier are associated with each other. Here, the identifier of the base station 21 included in NGsetupRequest and the port number "3850" of the SCTP, which is an endpoint on the base station side, are associated with each other.

In step S4003 and step S5001, the N1N2 gateway 41 and the AMF 110 of the CN-1 establish a SCTP association therebetween. Along with this, the N1N2 gateway 41 stores a port number "3860" of the SCTP.

In step S4004, the N1N2 gateway 41 stores a PLMN-ID of the CN-1 and a SCTP endpoint on the CN-1 side so that the PLMN-ID and the SCTP endpoint are associated with each other. Here, a PLMN-ID of a business operator operating the CN-1 included in NGsetupRequest and the port number "3860" of the SCTP, which is an endpoint on the core network side, are associated with each other. Further, the port number "3850" and the port number "3860" of the two endpoints are stored so as to be associated with each other.

The description here has dealt with the example in which the port number of the SCTP is used as the endpoint. However, the endpoint is not limited to the port number of the SCTP. In short, the endpoint may be any one, provided that it can specify a way to make connection with the base station and with the core network.

In step S4005, the N1N2 gateway 41 transmits NGSetupRequest to the AMF 110. In step S5002, this message is received.

In step S5003, the AMF 110 transmits, to the N1N2 gateway 41, NGSetupResponse, which is a response message to NGSetupRequest received in step S5002. In step S4006, this message is received.

In step S4007, the N1N2 gateway 41 transmits, to the base station 21, NGSetupResponse received in step S4006. At this time, for example, NGSetupResponse designating the port number "3850" of the endpoint on the base station side is transmitted. In step S2003, this message is received.

In the above-described manner, the NGAP tunnel between the core network provided with the AMF 110 and the base station 21 is established. In the process previously described with reference to FIG. 4, transmission and reception of messages related to establishment of the NGAP tunnel between the core network and the base station 21, having been carried out in the conventional 5G communication system, are relayed by the N1N2 gateway 41. Thus, from the base station 21 side, it appears as if the NGAP tunnel with the CN-1 were established as conventional.

Establishment of NGAP Tunnel With Core Network Having API Gateway

Figure 5:
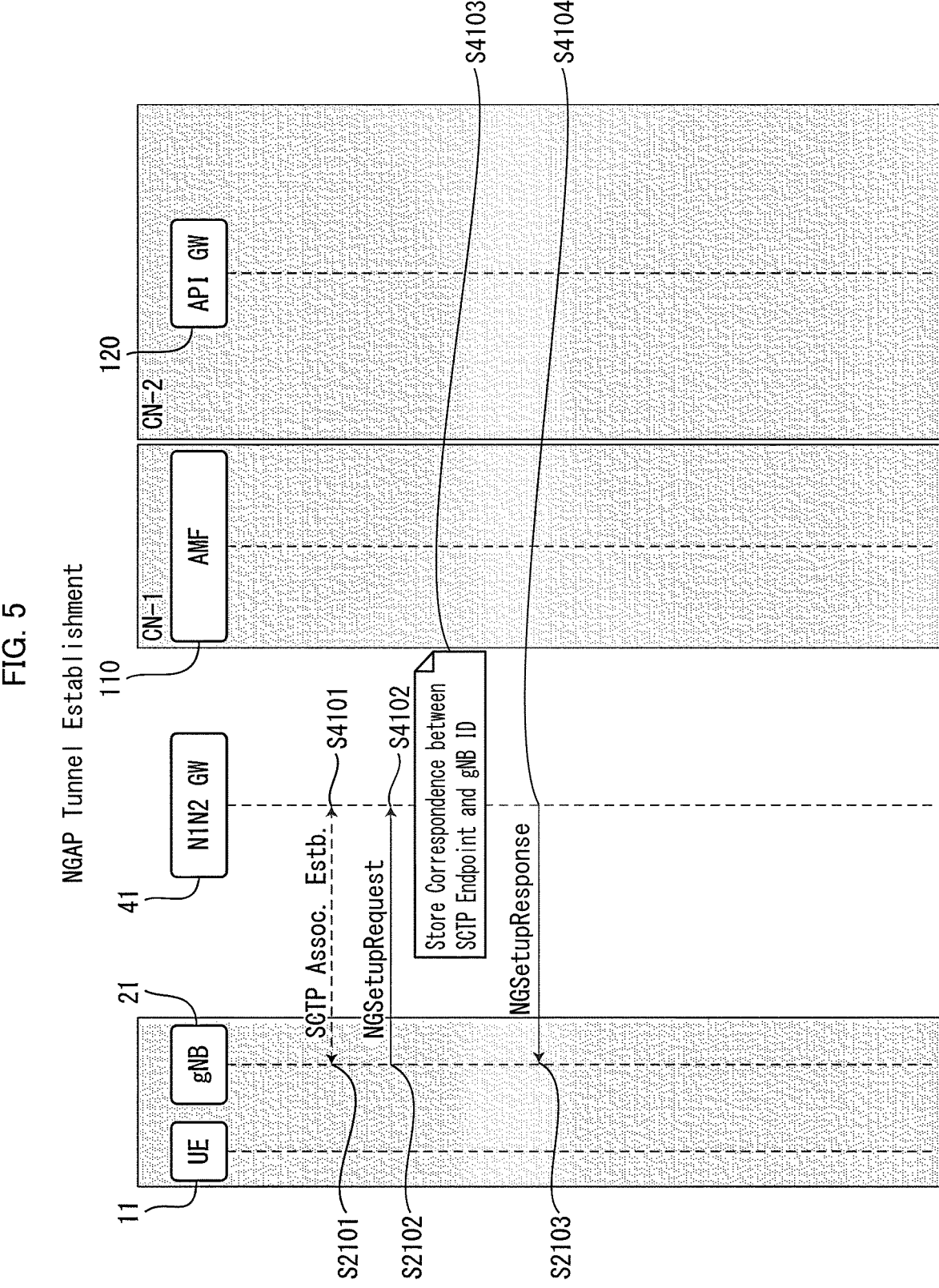
FIG. 5 is a view illustrating an example of a process related to establishment of a NGAP tunnel between the base station 21 and a CN-2.

FIG. 5 is a view illustrating an example of a process related to establishment of a NGAP tunnel between a base station 21 and the CN-2 (for example, the core network 100B).

In step S2101 and step S4101, the base station 21 and 41 establish a SCTP association the N1N2 gateway therebetween.

In step S2102, the base station 21 transmits NGSetupRequest to the N1N2 gateway 41. In step S4102, this message is received.

In step S4103, the N1N2 gateway 41 stores a SCTP endpoint and an identifier of the base station so that the SCTP endpoint and the identifier are associated with each other. Here, the identifier of the base station 21 included in NGsetupRequest and a port number of a SCTP, which is an endpoint on the base station side, are associated with each other.

The description here has dealt with the example in which the port number of the SCTP is used as the endpoint. However, the endpoint is not limited to the port number of the SCTP. In short, the endpoint may be any one, provided that it can specify a way to make connection with the base station.

In step S4104, the N1N2 gateway 41 transmits, as a response to NGSetupRequest received in step S4101, NGSetupResponse to the base station 21. In step S2103, this message is received.

In the above-described manner, a NGAP tunnel between the core network having the API gateway 120 and the base station 21 is established. Since the API gateway 120 employs the stateless protocol, the N1N2 gateway 41 cannot establish a SCTP association with the API gateway 120. Thus, instead of the API gateway 120, the N1N2 gateway 41 transmits NGSetupResponse to the base station 21. Also in this case, from the base station 21 side, it appears as if the NGAP tunnel with the CN-2 were established as conventional.

For example, in a case where the processes in step S2001, step S4001, step S2002, and step S4002 in FIG. 4 have been already executed, the processes in step S2101, step S4101, step S2102, step S4102, and step S4103 are not necessary. That is, once a SCTP association is established between the base station 21 and the N1N2 gateway 41, the base station 21 transmits NGSetupRequest by using the SCTP association. For example, in a case where the base station 21 is to establish a NGAP tunnel with the CN-2, CN-3, . . . after the process related to establishment of the NGAP tunnel with the CN-1 is completed, the base station 21 would not establish a new SCTP association with the N1N2 gateway 41.

The description here has dealt with the example in which the NGAP tunnel is terminated by the N1N2 gateway 41 itself. Alternatively, the NGAP tunnel may be terminated by the API gateway 120 and the CN-2. In this case, the N1N2 gateway 41 may simply transfer NGSetupRequest and NGSetupResponse.

Allocation of Radio Link to UE

Thereafter, a single piece of UE 11 or a plurality of pieces of UE 11 carry out communication with the core network(s)

via the base station 21 and the N1N2 gateway 41. In this process, the base station 21 notifies the UE 11 of a core network(s) (for example, the CN-1, CN-2, CN-3, . . . ) with which the base station 21 itself is connectable. In establishment of a radio link with the base station 21, the UE 11 designates a core network (for example, the CN-1) which is a connection destination.

A frame of New Radio (NR), which is a radio communication mode in the 5G communication system is provided with a Physical Broadcast Channel (PBCH) serving as a physical broadcast channel which notifies a main radio parameter. When making an initial access, the UE 11 detects information included in the PBCH. Consequently, the UE 11 also obtains a system parameter necessary to receive System Information Block (SIB) 1.

The base station 21 incorporates, into SIB1, PLMN-IDs of the core networks with which the base station 21 itself is connectable, and transmits a radio signal. Consequently, for example, the UE 11 is notified of the PLMN-IDs of the CN-1, CN-2, CN-3, . . . with which the base station 21 itself is connectable.

The UE 11 transmits, for example, a PLMN-ID (e.g., 22f640) of the CN-1, which is a core network with which the UE 11 itself should be connected in order to establish a radio link with the base station 21. In one example, the UE 11 may transmit, to the base station 21, the PLMN-ID of the CN-1 together with a Physical Random Access Channel (PRACH).

After the radio link with the UE 11 is established, the base station 21 gives, to the radio link with the UE 11, a RAN-UE-NGAP-ID, which is a unique ID. For example, UE 11-1, UE 11-2, UE 11-3, and UE 11-4, which are a plurality of pieces of UE, respectively establish a radio link W, a radio link X, a radio link Y, and a radio link Z with the base station 21. In this case, for example, the radio link W is given "100" as a RAN-UE-NGAP-ID, and the radio link X is given "200" as a RAN-UE-NGAP-ID. The radio link Y and the radio link Z are respectively given "300" and "400" as RAN-UE-NGAP-IDs.

Actually, the radio links W to Z are identified as respective different frequency bands, for example.

With this configuration, the base station 21 can identify the pieces of UE according to the RAN-UE-NGAP-IDs. Further, at the time of establishment of the radio links, the base station 21 is notified of the PLMN-IDs of the core networks which are to be connected. Therefore, the base station 21 may store the RAN-UE-NGAP-IDs and the PLMN-IDs so that the RAN-UE-NGAP-IDs and the PLMN-IDs are associated with each other.

As described above, the radio links are allocated to the pieces of UE. Consequently, the base station 21 can carry out communication with a large number of core networks merely by holding a single SCTP session with the N1N2 gateway 41. That is, with the configuration in which a RAN-UE-NGAP-ID is included in a message to be transmitted from a core network to UE, the base station 21 can transmit the message to the UE by identifying the radio link. This makes it possible to identify the UE to which the message is to be transmitted even without reference to the port number of the SCTP, thereby making it possible to connect a plurality of pieces of UE with a plurality of core networks by using the single SCTP session.

Selection of Core Network in Response to Request From UE (Version 1)

Figure 6:
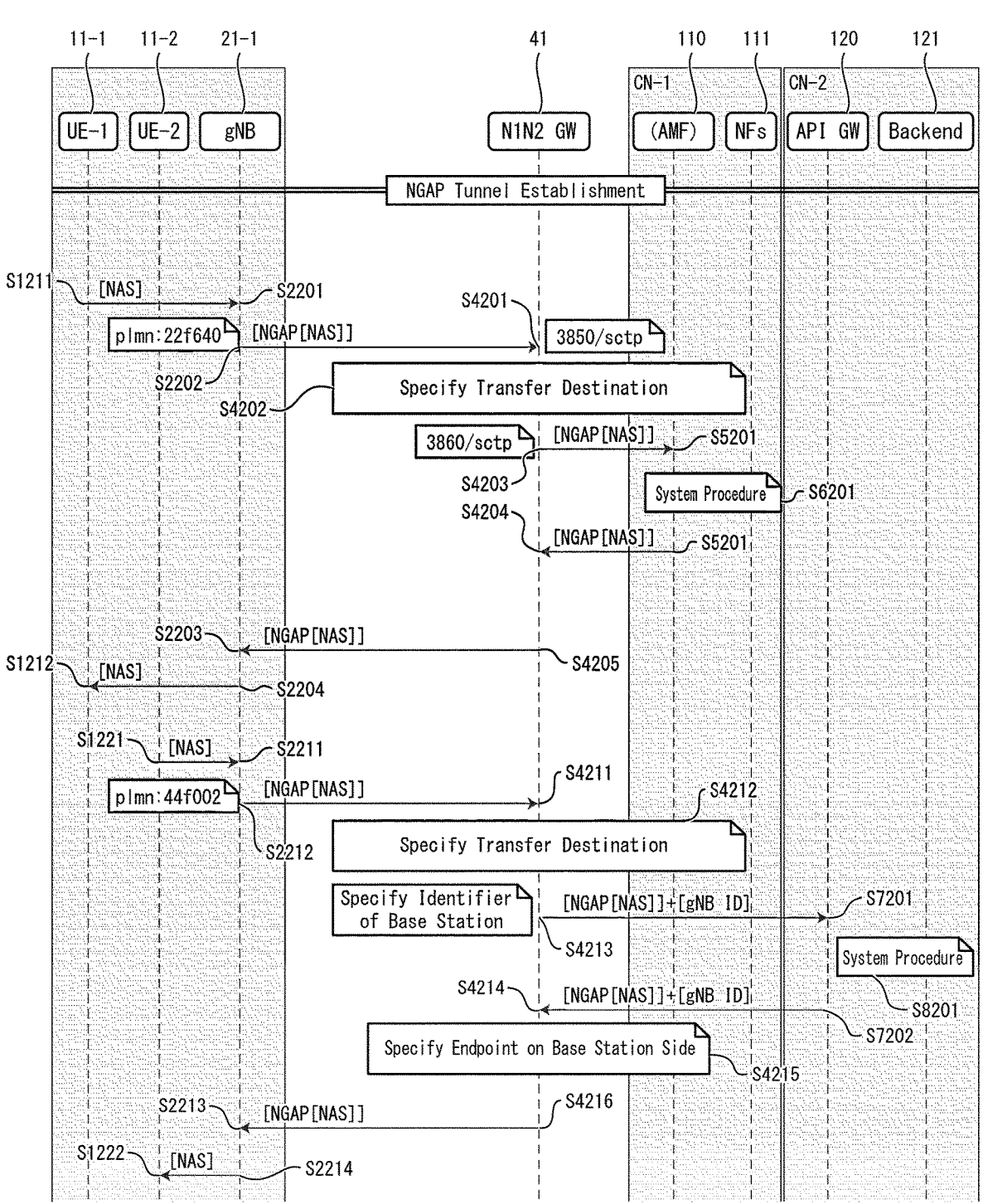
FIG. 6 is a view illustrating an example of selecting a core network in response to requests from a plurality of different pieces of UE connected via a single base station.

As described above, the N1N2 gateway 41 is connected with the plurality of core networks, so that each of the pieces of UE 11 connected with the base station 21 can carry out communication with an appropriate one of the core networks. FIG. 6 is a view illustrating an example of selecting, in response to requests from UE, a core network in the 5G communication system in accordance with the present embodiment, the selection of the core network being carried out in response to requests from a plurality of different pieces of UE connected via a single base station.

In the case shown in FIG. 6, a base station 21-1 is connected with a N1N2 gateway 41, and the CN-1 and the CN-2 commonly use the base station 21-1. That is, in the example shown in FIG. 6, a single base station 21-1 is connected with a single N1N2 gateway 41. Of the plurality of pieces of UE carrying out communication via the base station 21-1, UE 11-1 is connected with the CN-1, and UE 11-2 is connected with the CN-2. In this example, before messages are transmitted from the pieces of UE, establishment of the NGAP tunnel, which is previously described with reference to FIGS. 3 and 4, is completed.

Connection Between UE 11-1 and CN-1 Via Base Station 21-1

First, the following will describe an example in which selection of the core network (CN-1) is carried out in response to a request from the UE 11-1.

In step S1211, the UE 11-1 transmits a NAS message to the base station 21-1. In step S2201, the NAS message is received. In this process, transmitted as the NAS message is, for example, a request to initiate a single system procedure among a plurality of system procedures specified by TS.23.502. Note that the transmission of the NAS message is carried out via the radio link W which is established in advance.

For example, it is requested to initiate a system procedure such as Registration, PDU Session Establishment, or PDU Session Release. Note that the NAS message includes the PLMN-ID (22f640) of the CN-1.

In step S2202, the base station 21-1 generates a NGAP message including the NAS message received in step S2201, and transmits the NGAP message to the N1N2 gateway 41. In step S4201, the NGAP message is received. The NGAP message includes the PLMN-ID of the CN-1 and the RAN-UE-NGAP-ID (100) of the radio link W.

In step S4202, the N1N2 gateway 41 identifies a transfer destination. As described above, in the N1N2 gateway 41, information such as the table in which an address of the communication destination and a PLMN-ID are associated with each other is stored in the storage section 55 in advance. Thus, an address of an AMF 110 of the CN-1 associated with the PLMN-ID of the CN-1 is identified. The address may be an IP address, for example.

Further, for example, in a case where a SCTP association with the communication destination is already established, it may be configured such that a SCTP port number can be identified. In this case, a SCTP endpoint on the base station side and a SCTP endpoint on the core network side are also stored so that these SCTP endpoints are associated with each other.

In step S4203, the N1N2 gateway 41 transmits, to the AMF 110, the NGAP message received in step S4201. In step S5201, the NGAP message is received.

In step S6201, NFs 111 of the CN-1 executes a process related to a system procedure corresponding to an initiation request from the UE 11-1. The NFs 111 includes a plurality of NFs, and these NFs are collectively described as "NFs". For example, in a case where a request to initiate PDU Session Establishment is given in step S1211, a process related to PDU Session Establishment is executed by a NF(s) such as a Session Management Function (SMF) and/or a Policy Control Function (PCF) in the NFs 111.

Upon completion of the system procedure, in step S5201, the AMF 110 generates, as a response to the NGAP message received in step S5201, a NGAP message including a NAS message, and transmits the NGAP message to the N1N2 gateway 41. In step S4204, the N1N2 gateway 41 receives the NGAP message. The NGAP message includes the RAN-UE-NGAP-ID (100) of the radio link W.

In step S4205, the N1N2 gateway 41 transmits, to the base station 21, the NGAP message received in step S4204. In step S2203, the NGAP message is received.

In step S2204, the base station 21 transmits, to the UE 11-1, the NAS message included in the NGAP message received in step S2203. In this process, the base station 21 refers to the RAN-UE-NGAP-ID included in the NGAP message, and transmits the NAS message to the UE 11-1 via the radio link W.

In the above-described manner, selection of the core network (CN-1) is carried out in response to the request from UE 11-1.

Connection Between UE 11-2 and CN-2 Via Base Station 21-1

Next, the following will describe an example in which selection of the core network (CN-2) is carried out in response to a request from the UE 11-2.

In step S1221, the UE 11-2 transmits a NAS message to the base station 21-1. In step S2211, the NAS message is received. In this process, transmitted as the NAS message is, for example, a request to initiate a single system procedure among a plurality of system procedures specified by TS.23.502. Note that the transmission of the NAS message is carried out via the radio link X established in advance and the NAS message includes a PLMN-ID (44f002) of the CN-2.

In step S2212, the base station 21-1 generates a NGAP message including the NAS message received in step S2211, and transmits the NGAP message to the N1N2 gateway 41. In step S4211, the NGAP message is received. The NGAP message includes the PLMN-ID (44f002) of the CN-1 and the RAN-UE-NGAP-ID (200) of the radio link X.

In step S4212, the N1N2 gateway 41 identifies a transfer destination. As described above, in the N1N2 gateway 41, information such as the table in which an address of the communication destination and a PLMN-ID are associated with each other is stored in the storage section 55 in advance. Thus, an address of an API gateway 120 of the CN-2 associated with the PLMN-ID of the CN-2 is identified. The address may be an IP address, for example.

In step S4213, the N1N2 gateway 41 transmits, to the API gateway 120, the identifier of the base station 21-1 together with the NGAP message received in step S4211. In this process, the N1N2 gateway 41 identifies the identifier of the base station 21-1 on the basis of the information in which the SCTP endpoint and the identifier of the base station are associated with each other, the information having been stored at the time of establishment of the NGAP tunnel (step S4103 in FIG. 5).

Since the CN-2 is the core network employing the stateless protocol, the N1N2 gateway 41 does not store the SCTP endpoint on the core network side. That is, in the conventional 5G communication system, a SCTP association between the base station and the AMF of the core network is constantly maintained. Thus, the core network can identify, according to the SCTP association, the base station to which a message is to be transmitted. However, a SCTP association is not maintained between the N1N2 gateway 41 and the CN-2.

Thus, in order that the message transmitted from the CN-2 is delivered to the base station 21-1, the identifier of the base station 21-1 is transmitted together with the message from the base station 21-1. That is, when the first stateful communication section 51 which carries out communication with the base station 21-1 receives a NGAP message which is to be transmitted from the base station 21-1 to the CN-2, the stateless communication section 52 transmits, to the CN-2, information indicative of the identifier of the base station 21-1 together with the NGAP message. With this, it is possible to provide the 5G communication system without connecting the base station 21 and the CN-2 with each other according to the stateful protocol.

In step S7201, the NGAP message is received by the API gateway 120 of the CN-2.

In step S8201, a backend 121 of the CN-2 executes a process related to a system procedure corresponding to an initiation request from the UE 11-2. When the request to initiate the system procedure is given from the UE 11-2, backend 121 generates, for example, an instance of a program causing a computer to execute processes required from initiation to completion of the system procedure. This program may be a function.

For example, in a case where a single piece of UE gives a request to start Registration, a single instance fn-1-Reg corresponding to a function of Registration is generated. Then, in a case where another piece of UE gives a request to start Registration, another instance fn-2-Reg corresponding to a function of Registration is generated.

For example, in a case where a single piece of UE gives a request to initiate PDU Session Establishment, a single instance fn-1-PSE is generated. Then, in a case where another piece of UE 11 gives a request to initiate PDU Session Establishment, another instance fn-2-PSE is generated.

As described above, for each of the plurality of pieces of UE, an instance for each of the plurality of system procedures is generated.

Further, in the backend 121 of the CN-2, a computational resource is allocated every time an instance is generated. The "computational resource" herein means a resource related to a processor and a memory of a computer.

Further, in the backend 121 of the CN-2, a process related to a system procedure is executed with reference to a state of UE stored in a database. In the database, the states of the pieces of UE are stored in advance. Then, when the system procedure is completed, the state of the UE is updated. The updated state of the UE is stored in the database. Then, the instance corresponding to the completed system procedure is deleted, and a computational resource therefor is released.

As described above, the backend 121 of the CN-2 executes the process related to the system procedure in a mode different from that for the NFs 111 of the CN-1.

Upon completion of the system procedure, in step S7202, the API gateway 120 generates, as a response to the NGAP message received in step S7201, a NGAP message including a NAS message, and transmits the NGAP message to the N1N2 gateway 41. In this process, the identifier of the base station 21-1 received in step S7201 is transmitted together with the NGAP message. In step S4214, the NGAP message is received by the N1N2 gateway 41. The NGAP message includes the RAN-UE-NGAP-ID (200) of the radio link X.

In step S4215, the N1N2 gateway 41 identifies the endpoint on the base station side. In this process, according to the identifier of the base station 21-1 received together with the NGAP message in step S4214, a base station to which the NGAP message is to be transmitted is identified. Consequently, a SCTP endpoint associated with the identifier is identified. In this process, the N1N2 gateway 41 identifies the SCTP endpoint on the basis of the information in which the SCTP endpoint and the identifier of the base station are associated with each other, the information having been stored at the time of established of the NGAP tunnel.

In the case of the example shown in FIG. 6, the single base station 21-1 is connected with the N1N2 gateway 41. Therefore, it is clear that the base station to which the NGAP message is to be transmitted is the base station 21-1. In such a case, the process in step S4215 may be omitted.

In step S4216, the N1N2 gateway 41 transmits, to the base station 21-1, the NGAP message received in step S4214. In step S2213, the NGAP message is received.

In step S2214, the base station 21 transmits, to the UE 11-2, the NAS message included in the NGAP message received in step S2213. In this process, the base station 21 refers to the RAN-UE-NGAP-ID included in the NGAP message, and transmits the NAS message to the UE 11-2 via the radio link X.

In the above-described manner, selection of the core network (CN-2) is carried out in response to the request from UE 11-2.

As previously described with reference to FIG. 6, in the 5G communication system in accordance with the present embodiment, each of a plurality of pieces of UE connected with a single base station is allowed to carry out communication with an appropriate core network. In this process, regardless of the number of core networks, the base station may establish only one SCTP association with the N1N2 gateway.

Selection of Core Network in Response to Request From UE (Version 2)

In a case where all of the core networks connected with the N1N2 gateway 41 are core networks each having an API gateway employing the stateless protocol, it is possible to allow the plurality of base stations to be connected with the single N1N2 gateway 41. In other words, in a case where the N1N2 gateway 41 is not connected with the core networks according to the stateful protocol, it is possible to allow the plurality of base stations to be connected with the single N1N2 gateway 41.

Figure 7:
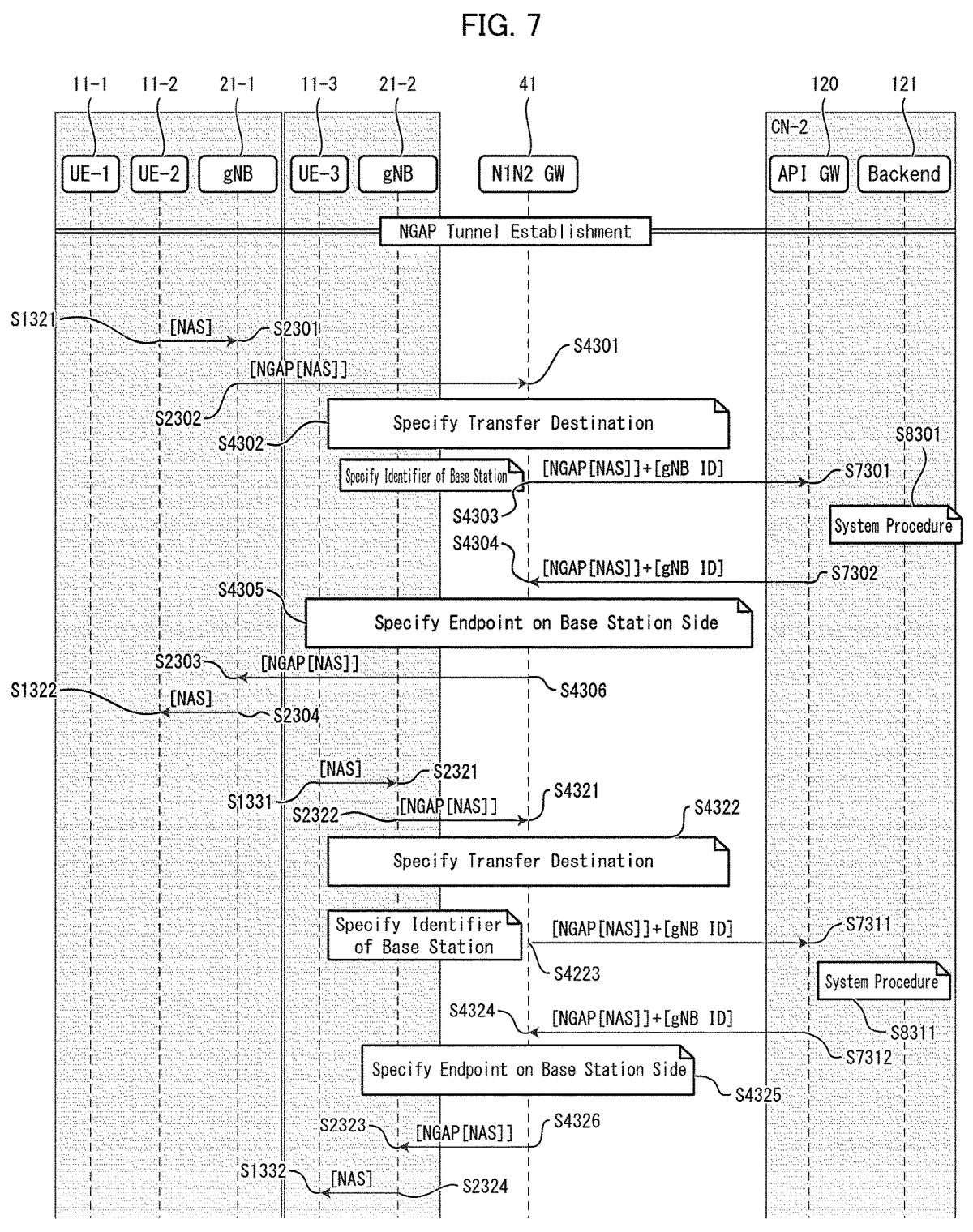

FIG. 7 is a view illustrating an example of selecting a core network in response to requests from UE in the 5G communication system in accordance with the present embodiment, the selection of the core network being carried out in response to requests from a plurality of different pieces of UE connected via different base stations.

In the case shown in FIG. 7, the base station 21-1 and the base station 21-2 are connected with the same N1N2 gateway 41. The UE 11-2 which carries out communication via the base station 21-1 is connected with the CN-2, and the UE 11-3 which carries out communication via the base station 21-2 is also connected with the CN-2. In this example, before messages are transmitted from the pieces of UE, establishment of the NGAP tunnel, which is previously described with reference to FIGS. 3 and 4, is completed.

Connection Between UE 11-2 and CN-2 Via Base Station 21-1

First, the following will describe an example in which selection of the core network (CN-2) is carried out in response to a request from the UE 11-2 connected with the base station 21-1.

In step S1321, the UE 11-2 transmits a NAS message to the base station 21-1. In step S2301, the NAS message is received. In this process, transmitted as the NAS message is, for example, a request to initiate a single system procedure among a plurality of system procedures specified by TS.23.502. Note that the transmission of the NAS message is carried out via the radio link Y established in advance and the NAS message includes the PLMN-ID (44f002) of the CN-2.

In step S2302, the base station 21-1 generates a NGAP message including a NAS message received in step S2301, and transmits the NGAP message to the N1N2 gateway 41. In step S4301, the NGAP message is received. The NGAP message includes the PLMN-ID (44f002) of the CN-2 and the RAN-UE-NGAP-ID (300) of the radio link Y.

In step S4302, the N1N2 gateway 41 identifies a transfer destination. As described above, in the N1N2 gateway 41, information such as the table in which an address of the communication destination and a PLMN-ID are associated with each other is stored in the storage section 55 in advance. Thus, an address of an API gateway 120 of the CN-2 associated with the PLMN-ID of the CN-1 is identified. The address may be an IP address, for example.

In step S4303, the N1N2 gateway 41 transmits, to the API gateway 120, the identifier of the base station 21-1 together with the NGAP message received in step S4301. In this process, the N1N2 gateway 41 identifies the identifier of the base station 21-1 on the basis of the information in which the SCTP endpoint and the identifier of the base station are associated with each other, the information having been stored at the time of establishment of the NGAP tunnel.

In step S7301, the NGAP message is received by the API gateway 120 of the CN-2.

In step S8301, the backend 121 of the CN-2 executes a process related to a system procedure corresponding to an initiation request from the UE 11-2. As described above, the backend 121 of the CN-2 executes the process related to the system procedure in a mode different from that for the NFs 111 of the CN-1.

Upon completion of the system procedure, in step S7302, the API gateway 120 generates, as a response to the NGAP message received in step S7301, a NGAP message including a NAS message, and transmits the NGAP message to the N1N2 gateway 41. In this process, the identifier of the base station 21-1 received in step S7301 is transmitted together with the NGAP message. In step S4304, the NGAP message is received by the N1N2 gateway 41. The NGAP message includes the RAN-UE-NGAP-ID (300) of the radio link Y.

In step S4305, the N1N2 gateway 41 identifies the endpoint on the base station side. In this process, according to the identifier of the base station 21-1 received together with the NGAP message in step S4304, a base station to which the NGAP message is to be transmitted is identified. Consequently, a SCTP endpoint associated with the identifier is identified. In this process, the N1N2 gateway 41 identifies the SCTP endpoint on the basis of the information in which the SCTP endpoint and the identifier of the base station are associated with each other, the information having been stored at the time of established of the NGAP tunnel.

In step S4306, the N1N2 gateway 41 transmits, to the base station 21-1, the NGAP message received in step S4304. In step S2303, the NGAP message is received.

In step S2304, the base station 21-1 transmits, to the UE 11-2, the NAS message included in the NGAP message received in step S2302. In this process, the base station 21-1 refers to the RAN-UE-NGAP-ID included in the NGAP message, and transmits the NAS message to the UE 11-2 via the radio link Y.

In the above-described manner, selection of the core network (CN-2) is carried out in response to the request from the UE 11-2.

Connection Between UE 11-3 and CN-2 Via Base Station 21-2

Next, the following will describe an example in which selection of the core network (CN-2) is carried out in response to a request from the UE 11-3 connected with the base station 21-2.

In step S1331, the UE 11-3 transmits a NAS message to the base station 21-2. In step S2321, the NAS message is received. In this process, transmitted as the NAS message is, for example, a request to initiate a single system procedure among a plurality of system procedures specified by TS.23.502. Note that the transmission of the NAS message is carried out via the radio link Z established in advance and the NAS message includes the PLMN-ID (44f002) of the CN-2.

In step S2322, the base station 21-2 generates a NGAP message including a NAS message received in step S2321, and transmits the NGAP message to the N1N2 gateway 41. In step S4321, the NGAP message is received. The NGAP message includes the PLMN-ID (44f002) of the CN-2 and the RAN-UE-NGAP-ID (400) of the radio link Z.

In step S4322, the N1N2 gateway 41 identifies a transfer destination. As described above, in the N1N2 gateway 41, information such as the table in which an address of the communication destination and a PLMN-ID are associated with each other is stored in the storage section 55 in advance. Thus, an address of an API gateway 120 of the CN-2 associated with the PLMN-ID (44f002) of the CN-1 is identified. The address may be an IP address, for example.

In step S4323, the N1N2 gateway 41 transmits, to the API gateway 120, the identifier of the base station 21-2 together with the NGAP message received in step S4321. In this process, the N1N2 gateway 41 identifies the identifier of the base station 21-2 on the basis of the information in which the SCTP endpoint and the identifier of the base station are associated with each other, the information having been stored at the time of establishment of the NGAP tunnel.

In step S7311, the NGAP message is received by the API gateway 120 of the CN-2.

In step S8311, the backend 121 of the CN-2 executes a process related to a system procedure corresponding to an initiation request from the UE 11-2. As described above, the backend 121 of the CN-2 executes the process related to the system procedure in a mode different from that for the NFs 111 of the CN-1.

Upon completion of the system procedure, in step S7312, the API gateway 120 generates, as a response to the NGAP message received in step S7311, a NGAP message including a NAS message, and transmits the NGAP message to the N1N2 gateway 41. In this process, the identifier of the base station 21-2 received in step S7311 is transmitted together with the NGAP message. In step S4324, the NGAP message is received by the N1N2 gateway 41. The NGAP message includes the RAN-UE-NGAP-ID (400) of the radio link Z.

In step S4325, the N1N2 gateway 41 identifies the end-point on the base station side. In this process, according to the identifier of the base station 21-2 received together with the NGAP message in step S4324, a base station to which the NGAP message is to be transmitted is identified. Consequently, a SCTP endpoint associated with the identifier is identified. In this process, the N1N2 gateway 41 identifies the SCTP endpoint on the basis of the information in which the SCTP endpoint and the identifier of the base station are associated with each other, the information having been stored at the time of established of the NGAP tunnel.

In step S4326, the N1N2 gateway 41 transmits, to the base station 21-2, the NGAP message received in step S4324. In step S2323, the NGAP message is received.

In step S2324, the base station 21-2 transmits, to the UE 11-3, the NAS message included in the NGAP message received in step S2322. In this process, the base station 21-2 refers to the RAN-UE-NGAP-ID included in the NGAP message, and transmits the NAS message to the UE 11-3 via the radio link Z.

In the above-described manner, selection of the core network (CN-2) is carried out in response to the request from UE 11-3.

Effects of First Embodiment

As described above, introduction of the N1N2 gateway enables connection with a wide variety of core networks by using the existing base stations. That is, with the configuration in which communication is carried out with core networks via the N1N2 gateway, it is possible to carry out communication with a core network employing the stateless protocol, for example.

Further, it is difficult to predict all specifications of core networks that can be employed in the future. Introduction of the N1N2 gateway also makes it possible to flexibly change the specifications of the core networks even without changing equipment or functions of the base stations. That is, introduction of the N1N2 gateway enables connection with a large number of core networks even without increasing the number of SCTP associations to be held in the existing base stations 21.

Furthermore, in session management by the N1N2 gateway and the API gateway, SCTP session management carried out between the base station and the AMF is not necessary. That is, it is possible to realize communication as if it were a WEB application in which the API gateway serves as a server and the N1N2 gateway serves as a client. In the WEB application, the number of access endpoints to the WEB server is logically one, and the server and the client maintain TCP sessions only while communication is carried out. Introduction of the N1N2 gateway makes it possible to allow connection between the base stations and the core networks to be in a mode having high extensibility like the WEB application.

As described above, according to the present embodiment, it is possible to provide a technique that enables flexible connection with a large number of core networks even without changing, for example, equipment and/or operating systems related to the existing base stations.

Second Embodiment

Variations of API Gateway

As described above, the API gateway 120B is constituted by, for example, software using API created by a communication business operator (company B) of the core network 100B, and does not establish a SCTP association.

For example, in a case where the core network 100B and the N1N2 gateway 41 shown in FIG. 2 carry out communication by a MQ, the API gateway 120 may be configured to have two queues. For example, an upLinkMQ 151 in which messages transmitted from the N1N2 gateway 41 are accumulated and a downLinkMQ 161 in which messages which are to be transmitted to the N1N2 gateway 41 are accumulated may be provided to the API gateway 120.

Note that the upLinkMQ 151 and the downLinkMQ 161 will be respectively referred as "MQ 151" and "MQ 161" as appropriate. That is, the core network 100 causes messages transmitted from the N1N2 gateway 41 to be accumulated in a first message queue (MQ 151) and asynchronously processes the messages, and the core network 100 causes messages which are to be transmitted to the N1N2 gateway 41 to be accumulated in a second message queue (MQ 161) and asynchronously processes the messages.

In this case, in the storage section 55 of the N1N2 gateway 41, information in which a PLMN-ID and IP addresses of the upLinkMQ 151 and the downLinkMQ 161 are associated with each other is stored.

With such a configuration, it is possible to decentralize process loads at a peak in the core network, for example. Therefore, for example, it is possible to reduce occurrence of congestion even without increasing the computational resource.

Further, the API gateway 120 may be provided with upLinkMQs 151 and downLinkMQs 161 such that the upLinkMQs 151 and the downLinkMQs 161 are associated with their corresponding system procedures. For example, MQs may be provided such that an upLinkMQ 151-1 and a downLinkMQ 161-1 are provided for registration and an upLinkMQ 151-2 and a downLinkMQ 161-2 are provided for PDU session establishment, . . . .

For example, in a case where, among system procedures processed in the core network, a specific system procedure is intended to be processed preferentially, the upLinkMQs 151 and the downLinkMQs 161 may be provided for corresponding system procedure. With such a configuration, it is possible to easily set priority levels of the system procedures, for example.

Furthermore, the API gateway 120 may be configured by adding a function to the existing AMF 110, for example.

Third Embodiment

Variations of N1N2 Gateway Connection

In the examples explained in the foregoing embodiments, the base station 21 is constantly connected with the core networks via the N1N2 gateway 41. Alternatively, for example, connection with the core network having the AMF 110 may be made not via the N1N2 gateway 41.

For example, in order to carry out communication with the core network 100I and the core network 100A shown in FIG. 2, the base station 21 may directly carry out the communication with the core network 100I and the core network 100A, not via the N1N2 gateway 41. With such a configuration, it is possible to more effectively utilize the existing equipment.

Software Implementation Example

Figure 8:
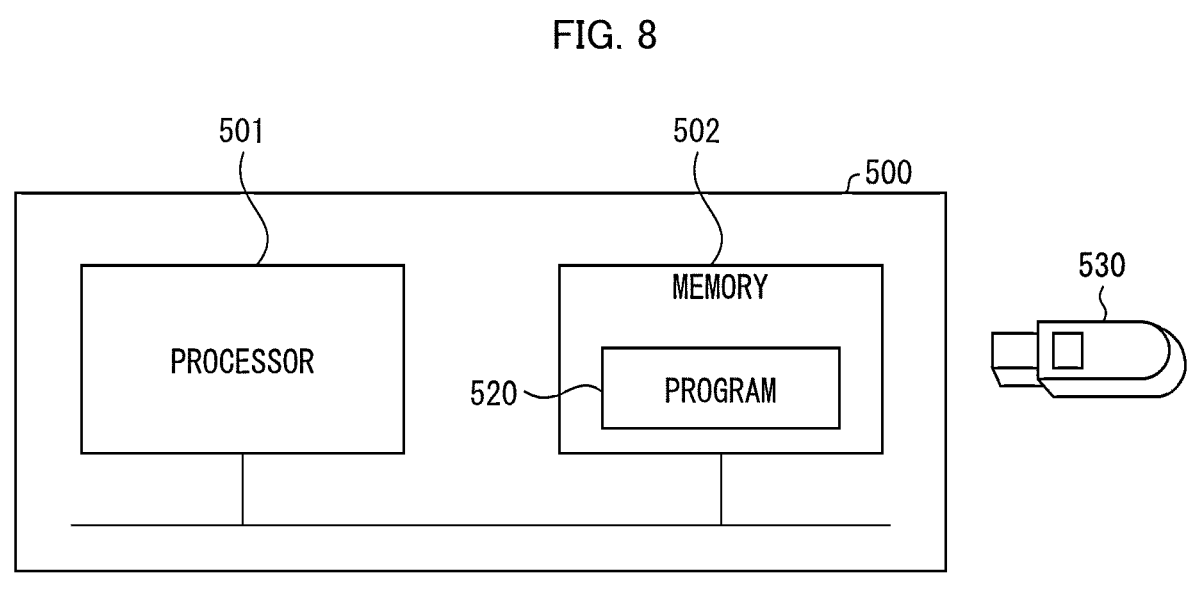

The N1N2 gateway 41 described above can be realized by a program installed on a computer, the program causing the computer to function as the N1N2 gateway 41. In this case, the N1N2 gateway 41 includes, as hardware for executing the program, a computer which includes (i) at least one control device (e.g., processor) and (ii) at least one storage device (e.g., memory). An example of such a computer is illustrated in FIG. 8.

A computer 500 includes at least one processor 501 and at least one memory 502. In the memory 502, a program 520 for causing the computer 500 to function as the N1N2 gateway 41 is stored. In the computer 500, the processor 501 reads the program 520 from the memory 502 and executes the program 520, so that the functions of the N1N2 gateway 41 are realized.

The processor 501 can be, for example, a Central Processing Unit (CPU), a Graphic Processing Unit (GPU), a Digital Signal Processor (DSP), a Micro Processing Unit (MPU), a Floating point number Processing Unit (FPU), a Physics Processing Unit (PPU), a microcontroller, or a combination of any of them.

The memory 502 can be, for example, a flash memory, a Hard Disk Drive (HDD), a Solid State Drive (SSD), or a combination of any of them.

Note that the computer 500 can further include a Random Access Memory (RAM) in which the program 520 is loaded when the program 520 is executed and in which various kinds of data are temporarily stored. The computer 500 can further include a communication interface for carrying out transmission and reception of data with other apparatuses. The computer 500 can further include an input-output interface for connecting input-output apparatuses such as a keyboard, a mouse, a display, and/or a printer.

The program 520 for causing the computer 500 to operate as the N1N2 gateway 41 can be stored in a non-transitory tangible storage medium 530 which is readable by the computer 500. The storage medium 530 can be, for example, a tape, a disk, a card, a semiconductor memory, a programmable logic circuit, or the like. The computer 500 can obtain the program 520 via the storage medium 530.

The program 520 for causing the computer 500 to operate as the N1N2 gateway 41 can be transmitted via a transmission medium. The transmission medium can be, for example, a communications network, a broadcast wave, or the like. The computer 500 can obtain the program 520 also via such a transmission medium.

A part of or all of the functions of the N1N2 gateway 41 can also be realized by a logical circuit. For example, an integrated circuit on which a logical circuit functioning as the control blocks is formed may also be encompassed in the present invention. Further, the functions of the control blocks can also be realized by a quantum computer, for example.

Further, since the above-described aspects of the present invention give the foregoing effects, it is possible to contribute to achievement of Goal 9 "Build resilient infrastructure, promote inclusive and sustainable industrialization and foster innovation." of Sustainable Development Goals (SDGs).

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

An information processing device in accordance with a first aspect of the present invention is an information processing device which is connected with a base station and which serves as at least one of (i) an interface via which the base station and a first core network are connected with each other and (ii) an interface via which a terminal device connected with the first core network via the base station and the first core network are connected with each other, the information processing device including: a first stateful communication section configured to carry out communication with the base station according to a stateful protocol; and a stateless communication section configured to carry out communication with the first core network according to a stateless protocol.

An information processing device in accordance with a second aspect of the present invention is configured such that, in the first aspect, the first core network includes a relay section configured to relay the communication with the information processing device, and the information processing device further includes a storage section configured to store therein information in which an address of the relay section and a business operator identifier of the first core network are associated with each other.

An information processing device in accordance with a third aspect of the present invention is configured such that, in the second aspect, the relay section causes messages transmitted from the information processing device to be accumulated in a first message queue and asynchronously processes the messages; and the relay section causes messages which are to be transmitted to the information processing device to be accumulated in a second message queue and asynchronously processes the messages.

An information processing device in accordance with a fourth aspect of the present invention is configured such that, in the second or third aspect, the relay section is constituted by software which uses an API provided by a communication business operator of the first core network.

An information processing device in accordance with a fifth aspect of the present invention is configured such that, in any one of the first to fourth aspects, the first stateful communication section carries out communication with a plurality of base stations.

An information processing device in accordance with a sixth aspect of the present invention is configured such that, in the fifth aspect, in a case where the first stateful communication section receives a NGAP message which is transmitted from the base station to the first core network, the stateless communication section transmits, to the first core network, information indicative of an identifier of the base station together with the NGAP message.

An information processing device in accordance with a seventh aspect of the present invention is configured such that, in any of the second to fourth aspects, the information processing device further includes a second stateful communication section configured to carry out communication with a second core network according to a stateful protocol, wherein the information processing device further serves as at least one of (i) an interface via which the base station and the second core network are connected with each other and (ii) an interface via which a terminal device connected with the second core network via the base station and the second core network are connected with each other.

An information processing device in accordance with an eighth aspect of the present invention is configured such that, in the seventh aspect, the storage section is further configured to store therein information in which an address of an AMF of the second core network and a business operator identifier of the second core network are associated with each other.

An information processing device in accordance with a ninth aspect of the present invention is configured such that, in any of the first to eighth aspects, the stateful protocol is a SCTP; and the stateless protocol is a RPC or a MQ.

An information processing method in accordance with a tenth aspect of the present invention is an information processing method for an information processing device which is connected with a base station and which serves as at least one of (i) an interface via which the base station and a first core network are connected with each other and (ii) an interface via which a terminal device connected with the first core network via the base station and the first core network are connected with each other, the information processing method including: a first stateful communication step of carrying out communication with the base station according to a stateful protocol; and a stateless communication step of carrying out communication with the first core network according to a stateless protocol.

A program in accordance with an eleventh aspect of the present invention is a program causing a computer to function as an information processing device which is connected with a base station and which serves as at least one of (i) an interface via which the base station and a first core network are connected with each other and (ii) an interface via which a terminal device connected with the first core network via the base station and the first core network are connected with each other, the information processing device including: a first stateful communication section configured to carry out communication with the base station according to a stateful protocol; and a stateless communication section configured to carry out communication with the first core network according to a stateless protocol.

REFERENCE SIGNS LIST

11: UE
21: base station
41: N1N2 gateway
51: first stateful communication section
52: stateless communication section
53: second stateful communication section
54: control section
55: storage section
100: core network
110: AMF
120: API gateway

The invention claimed is:

1. An information processing device connected between a base station and a first core network and acting as an interface for communications between (i) the base station and the first core network or (ii) any terminal device connected via the base station and the first core network, the information processing device comprising:

a stateful communication section configured to carry out communication with the base station according to a stateful protocol, and a stateless communication section configured to carry out communication with the first core network according to a stateless protocol;

wherein the information processing device is operative to convert messages between the stateful protocol and the stateless protocol, the first core network includes a relay gateway comprising software which utilizes Application Programming Interface (API) operative to receive communications from the information processing device, process the communications in accordance with a core network protocol, and transmit the processed communications to the first core network, and the device further comprises memory storing information in which an address of the relay gateway and a business operator identifier of the first core network are associated with each other.

2. The information processing device according to claim 1, wherein:

the relay gateway includes a first message queue for messages received from the information processing device and a second message queue for messages to be sent to the information processing device, the relay gateway being configured to process messages in these queues asynchronously.

3. The information processing device according to claim 1, wherein:

the relay gateway is constituted by software which uses an Application Programming Interface (API) provided by a communication business operator of the first core network.

4. The information processing device according to claim 1, wherein:

the stateful communication section interface is operative to communicate with a plurality of base stations.

5. The information processing device according to claim 4, wherein:

in a case where the stateful communication section receives a Next Generation Application Protocol (NGAP) message transmitted from the base station to the first core network, the stateless communication section transmits the NGAP message to the first core network together with an identifier of the base station.

6. The information processing device according to claim 1, wherein the stateful communication section is further configured to carry out communication with a second core network according to a stateful protocol, the information processing device thereby also acting as an interface between the base station and the second core network (including for communications between a terminal device and the second core network via the base station).

7. The information processing device according to claim 6, wherein:

the memory storing information further stores information in which an address of an Access and Mobility Management Function (AMF) of the second core network and a business operator identifier of the second core network are associated with each other.

8. The information processing device according to claim 1, wherein:

the stateful protocol is a Stream Control Transmission Protocol (SCTP); and the stateless protocol is selected from Hypertext Transfer Protocol (HTTP), Remote Procedure Call (RPC), or Message Queue (MQ).

9. An information processing method for an information processing device connected between a base station and a first core network and acting as an interface for communications between (i) the base station and the first core network or (ii) any terminal device connected via the base station and the first core network, the information processing method comprising:

a first stateful communication step including establishing and maintaining communication with the base station according to a stateful protocol; and a stateless communication step including transmitting and receiving messages with the first core network according to a stateless protocol;

wherein the information processing device is operative to convert messages between the stateful protocol and the stateless protocol, the first core network includes a relay gateway comprising software which utilizes Application Programming Interface (API) operative to receive communications from the information processing device, process the communications in accordance with a core network protocol, and transmit the processed communications to the first core network, and the device further comprises memory storing information in which an address of the relay gateway and a business operator identifier of the first core network are associated with each other.

10. A computer-readable non-transitory recording medium having recorded thereon a program causing a computer to perform the method of claim 9.

* * * * *